May 29, 1956    A. P. COLBURN ET AL    2,747,849
VAPOR AND LIQUID CONTACTING
Filed July 30, 1953
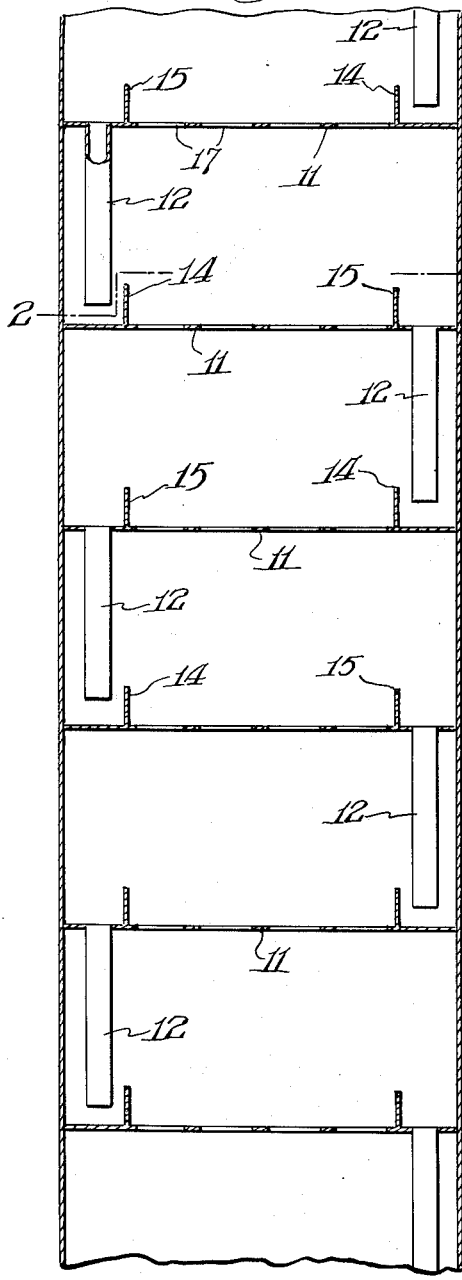
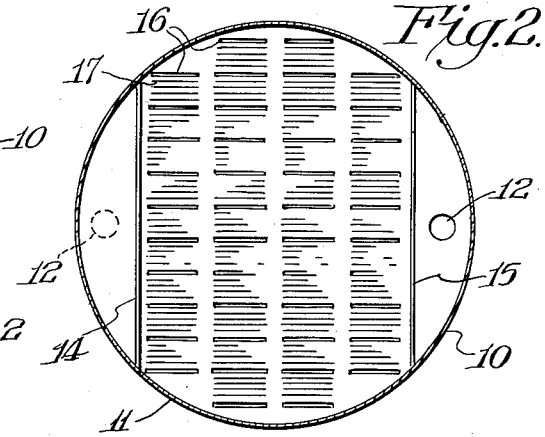
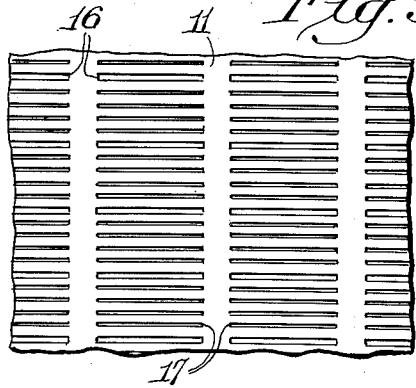
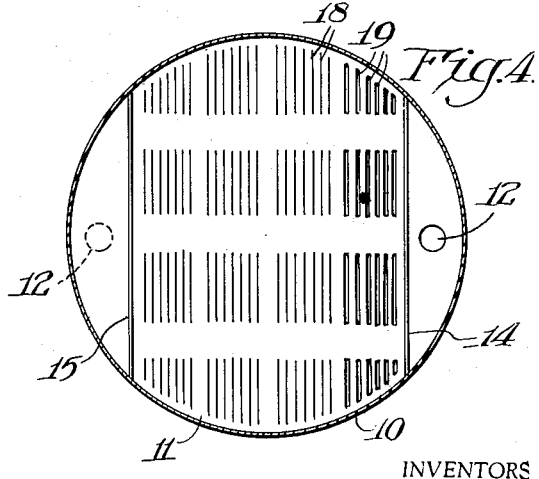
INVENTORS
Allan P. Colburn
James B. Jones,
and Cyrus Pyle
BY
ATTORNEY

United States Patent Office 2,747,849
Patented May 29, 1956

2,747,849

VAPOR AND LIQUID CONTACTING

Allan P. Colburn, Newark, James B. Jones, Wilmington, and Cyrus Pyle, New Castle, Del., assignors to E. I. du Pont de Nemours & Company, Wilmington, Del., a corporation of Delaware Application July 30, 1953, Serial No. 371,282

1 Claim. (Cl. 261—114)

This invention relates to contacting liquids with gases as pertains to fractionating towers, stripping towers, absorption towers, plate-type reactors, and the like.

Various attempts have heretofore been made to apply perforated plates or so called sieve-plate structures in gas and liquid contact apparatus, but such attempts have been accompanied by the serious problem of leakage at low vapor rates due to liquid reflux falling through the plate perforations with accompanying reduction in contacting efficiency, due in part to inactivity of a substantial portion of the plate. Also, such plate instability is encountered when the gradient of the liquid flowing across the plate is so great that the perforations at the inlet end or inlet side of the plate cease to function.

The maximum vapor rate of a perforated or sieve type of plate is also necessarily limited by the pressure drop incurred by the vapor as it passes through the perforations. The hole diameter of such plates considered in previous studies was about 0.116 inch or greater, and the pressure drop due to bubble formation (usually designated $p_b$) was relatively small compared with the total pressure drop.

We have now found that this tendency to bubble formation can be put to work to accomplish new and unexpected results under certain conditions of operation and existing vapor pressures. We have found furthermore that the operating range of plates of this type can be extended provided they are constructed to perform as a low free area plate at low vapor rates and as a high free area plate at high vapor rates. Also that the range of such a plate can be further extended provided the effect of hydraulic gradient on plate stability at low vapor rates can be reduced.

More particularly our invention relates to improvements in sieve-plate towers having a series of trays mounted therein, and especially to means of controlling conditions of flow of liquid thereover and therethrough to produce a progressive concentration of the adsorbent liquids whereby two outstanding results are accomplished, namely; (1) the range of operable vapor rates is materially increased without incurring leakage of reflux liquid through the perforations at low rates, and (2) the limits of stable plate operation are greatly extended by reducing the effect of hydraulic gradient.

As contrasted with bubble-cap towers, one of the most serious problems confronting the art in efforts to obtain comparable results with sieve-plate towers has been that of leakage, which consists of liquid reflux falling through the plate perforations when operated at low vapor rates, thus resulting in reduced contacting efficiency. Also, plate instability is encountered when the gradient of the liquid flowing across the plate is so great or the vapor rate is so low that the perforations at the inlet end of the plate to function, thus further reducing the contacting …, since only a portion of the plate is then active. …tors limit the vapor rates at which sieve-plate …be operated satisfactorily.
…re, the maximum vapor rate of sieve-plate towers is also frequently limited by the pressure drop incurred by the vapor as it passes through the perforations.

An object of the present invention therefore is to overcome or eliminate the foregoing disadvantages of the prior practice and to improve generally on the structure of sieve-plate towers or contactors.

Another and more specific object of our invention is the development of a sieve plate capable of maintaining stability, that will remain nonleaking at low vapor rates, and at the same time will not develop or exhibit excessive pressure drop at high vapor rates.

Still another object of our invention is the provision of means for putting surface tension forces to work to accomplish new and useful purposes.

Another object of this invention is to further extend the range of such plates in a manner that will reduce the effect of hydraulic gradient on plate stability at low vapor rates.

A further object of this invention is to extend the operating range of sieve-plate type towers so that the individual plates will perform as a low free area at low vapor rates and as a high free area at high vapor rates.

The various objects and features of our invention may be attained by means of the apparatus illustrated in the accompanying drawing in which—

Fig. 1 is a partial view of a typical sieve-plate tower with certain parts shown in section to illustrate the general application of our invention;

Fig. 2 is a transverse, sectional view of the tower, being a view taken as indicated on line 2—2 of Fig. 1;

Fig. 3 is an enlarged, detailed view of a portion of the sieve plate of Fig. 2, showing the construction provided by our invention; and Fig. 4 is a view of a modified form of the sieve plate of Fig. 2.

According to one embodiment of our invention, we have found that these objects can be accomplished by a sieve plate having rectangular slots of different or varying widths, with the wider slots interspersed uniformly among the more narrow slots. With this arrangement the wider slots, which require less pressure to cause bubbling, remain active at low vapor rates, while the narrow slots become inactive but are maintained free from leaking by surface tension forces. As the vapor rate is increased, the pressure drop rises until sufficient pressure drop is developed across the plate to cause bubbling in the narrow slots. The effective free area of the plate is increased by the opening of the narrow slots and a wide operating range is thus obtained with only a small change in pressure drop. The nature of the bubbling action in the individual slots magnifies this variation in effective free area. The individual slots remain partly closed at low vapor rates and tend to open gradually to provide additional free area as vapor rate is increased.

According to another embodiment of our invention, a variation of the multiwidth slots is preferable when an appreciable hydraulic gradient is present or to be encountered. In this design, only the wider slots are cut in the inlet side of the plate and narrow slots are cut in the outlet side. In this manner, the deeper liquid depth at the inlet side of the plate is offset by lesser pressure required to initiate bubbling in the wider slots. This permits the entire plate surface to be active even at low vapor rates involving appreciable hydraulic gradient.

In order to further illustrate and describe one form in which the multiwidth slots may be arranged for operation, reference is made to Fig. 1 of the drawing in which a series of the sieve plates 11 are mounted in spaced relation in a tower 10. Liquid entering the customary downspouts 12 flows over weir 14 and across the perforated plate, thence over weir 15 to the downspout 12 leading to the plate next below. Figures 2 and 3 illustrate more specifically the arrangement of the multiplicity of narrow slots 17 with relation to the wider slots 16, in the ratio of 4:1.

In Figure 4, the modified form of sieve plate is provided in which rows of the more narrow slots or perforations 17 are provided at the outlet side of the plate, while the larger slots or perforations 19 are provided at the inlet side of the plate.

With more particular reference to the foregoing first embodiment of our invention, the following example of an actual installation as made and operated will serve as a further specific illustration.

A sieve plate was sawed with slots of two different widths with the wider slots placed uniformly among the more numerous narrower slots. The width of the narrow slots was 0.01 inch and that of the wide slots 0.03 inch, and the slots were present in the ratio of 4:1. The actual slot widths as well as the numerical ratio of narrow-to-wide slots are determined by the nature of the liquid to be handled and the operating range desired. Width of the narrow slots may be varied between 0.006 and 0.02 inch, while the width of the wide slot may vary from 0.02 to 0.03 inch. The numerical ratio of narrow-to-wide slots may be varied within wide limits, and plate designs actually calculated have employed a ratio as low as 4:1 and as high as 15:1. The narrow slots are always preferably more numerous than the wide slots, the actual ratio depending on the desired operating range and the maximum allowable pressure drop.

For a liquid of known surface tension, the narrow slot width was chosen so that leakage at low vapor rates is prevented by surface tension although the slots may sometimes become inactive. The wider slots remained active at low vapor rates because less pressure is required to maintain bubbling as shown in the following table:

*Pressure required to form bubbles, $p_b$*

| Perforation dimensions: | $p_b$, in. of water |
|---|---|
| 0.01 x 1.64 in | 2.00 |
| 0.02 x 1.64 in | 0.98 |
| 0.03 x 1.64 in | 0.70 |
| 0.125 in. diam | 0.37 |

NOTE.—All values are experimental measurements employing the system air-water.

Since the wide slots were interspersed uniformly among the narrow slots, the entire plate remains active even at very low vapor rates. As the vapor rate is increased, the pressure drop across the plate becomes great enough to initiate bubbling in the narrow slots, thereby increasing the effective free area of the plate. Since the effective free area increased as the vapor rate is increased, the rise in pressure drop normally accompanying increased vapor rate was greatly reduced. The result was a wide-range sieve plate which was maintained completely active and non-leaking at low vapor rates, yet did not exhibit excessively high increase in pressure drop for high vapor rates.

Narrow sawed slots were found to possess an inherent property which added to the variable free area characteristics desired for the multiwidth slotted plate. High-speed motion pictures showed that the slots were only partly open at low vapor rates but gradually opened as vapor rate was increased. This phenomenon was noted for all slots ranging from 0.009 to 0.03 inch in width, the greatest difference being observed with the narrow slots.

For the second embodiment a sieve plate was made with slots of two different widths. The narrow slots were located at the liquid outlet end of the plate and the wider slots at the liquid inlet end. The slot dimensions were so chosen that the difference in the pressure required to initiate bubbling would be equivalent to the hydraulic gradient across the plate. The necessary difference in slot widths therefore became greater as hydraulic gradient was increased. In this manner the pressure drop required to maintain uniform bubbling action was equalized at both ends of the plate and stable operation was maintained even at the lowest operable vapor rates. The number of slots per linear inch was adjusted to maintain the same free area per square foot over the entire surface of the plate, thus insuring proper vapor distribution at increased vapor rates.

It will therefore be seen that by means of the foregoing invention the operating range of such perforated sieve-plate towers may be substantially extended since the plates as thus constructed may be operated as low free areas at low vapor rates and high free areas at high vapor rates while at the same time the effect of hydraulic gradient on plate stability at low vapor rates is also reduced. This is accomplished by maintaining the wider perforations operating at low vapor rates to keep the plate bubbling over its entire area even at low vapor rates, and opening the narrow perforations as vapor is increased, thus utilizing the free area as a function of the vapor rate to afford a wide range of operations without excessive increase in pressure drop. Accordingly, the range of operable vapor rates is increased without incurring leakage of reflux liquid through the perforations at low vapor rates, and the limits of stable operations are greatly extended by reducing the effect of hydraulic gradient.

By the term "free area" as used herein, we mean the percentage hole or slot area, based on the cross-sectional area of the tower.

In co-pending application of one of us (J. B. Jones), Serial No. 371,315, filed July 30, 1953, numerous advantages have been shown to result from improved types of sieve-plate towers when operated under improved conditions of control as therein described.

According to the foregoing description of the present invention, it has been shown that increased advantages and control of liquid-gas contacting are obtained and the range of operations greatly extended provided the relative sizes of perforations are coordinated within certain definite limits as hereinbefore fully described.

We claim:

In the contacting of liquids and gases in which the liquid moves downward over and across successive sieve-type trays in spaced relation in a tower, a series of trays having wide slots and narrow slots in spaced relation in the ratio of between 4:1 and 15:1 in which the width of the wider slots is between 0.02 and 0.03 inch and the width of the narrow slots is between 0.006 inch and 0.02 inch, said trays being adapted to being maintained in a state of active bubbling and substantially free of leakage of reflux liquid at low vapor rates and substantially free of excessive pressure drop at high vapor rates.

References Cited in the file of this patent

UNITED STATES PATENTS

| 1,824,836 | Piggot | Sept. 29, 1931 |
| 2,020,751 | West | Nov. 12, 1935 |
| 2,077,652 | Wessblad et al. | Apr. 20, 1937 |
| 2,374,950 | Packie | May 1, 1945 |

FOREIGN PATENTS

| 128,497 | Austria | May 25, 1932 |